United States Patent [19]

Wong et al.

[11] Patent Number: 5,163,017
[45] Date of Patent: Nov. 10, 1992

[54] PIPELINED FAST FOURIER TRANSFORM (FFT) ARCHITECTURE

[75] Inventors: Yiwan Wong; Toshiaki Yoshino; Louis G. Johnson, all of Dallas, Tex.

[73] Assignee: Texas Instruments Incorporated, Dallas, Tex.

[21] Appl. No.: 755,587

[22] Filed: Sep. 3, 1991

Related U.S. Application Data

[63] Continuation of Ser. No. 500,436, Mar. 23, 1990, abandoned.

[51] Int. Cl.$^5$ .......................... G06F 7/34; G06F 15/35
[52] U.S. Cl. ...................................................... 364/726
[58] Field of Search ................................. 364/726, 725

[56] References Cited

U.S. PATENT DOCUMENTS

| | | | |
|---|---|---|---|
| 4,266,279 | 5/1981 | Hines | 364/726 |
| 4,298,950 | 11/1987 | Smith, Jr. | 364/726 |
| 4,501,149 | 2/1985 | Konno et al. | 364/726 |
| 4,547,862 | 10/1985 | McIver et al. | 364/726 |
| 4,563,750 | 1/1986 | Clarke | 364/726 |
| 4,601,006 | 7/1986 | Liv | 364/726 |
| 4,612,626 | 9/1986 | Marchant | 364/726 |
| 4,689,762 | 8/1987 | Thibodeau, Jr. | 364/726 |
| 4,769,779 | 9/1988 | Chang et al. | 364/726 |
| 4,821,224 | 4/1989 | Liv et al. | 364/726 |
| 4,996,661 | 2/1991 | Cox et al. | 364/726 |

OTHER PUBLICATIONS

O'Brien et al., "A 200 MIPS Single-Chip 1K FFT Processor", IEEE for the International Solid-State Circuits Conference, Feb. 16, 1989, pp. 166-168.

Magar et al., "An Application Specific DSP Chip Set for 100MHz Data Rates", IEEE for 1988 International Conf. on Acoustics, Speech, and Signal Processing, Sep. 1988.

Dr. Eldon, "Four on a Chip", IEEE for the Workshop of VLSI Signal Processing, Nov. 1988, pp. 15-20.

Annaratone, Marco, *Digital CMOS Circuit Design*, The Kluwer International Series in Engineering and Computer Science, Kluwer Academic Publishers, 1986, pp. 209-231.

Oppenheim, Alan V., Schafer, Ronald W.; *Digital Signal Processing*, Prentice-Hall, Inc., Englewood Cliffs, New Jersey, 1975, pp. 302-307.

*Primary Examiner*—Long T. Nguyen
*Attorney, Agent, or Firm*—Ira S. Matsil; James C. Kesterson; Richard L. Donaldson

[57] ABSTRACT

A pipelined Fast Fourier Transform (FFT) architecture includes a memory for storing complex number data. A pipelined data path is coupled to the memory for accessing R complex number data therefrom, for computing an FFT butterfly, and storing R results from the FFT butterfly computation in the memory during one pipeline cycle.

20 Claims, 9 Drawing Sheets

WHERE $n = 0, 1, ..., \frac{N}{4} - 1$

FIG. 3

WHERE $n = 0, 1, ..., \frac{N}{4} - 1$

PIPELINED FAST FOURIER TRANSFORM (FFT) ARCHITECTURE

This application is a continuation of application Ser. No. 07/500,436, filed Mar. 23, 1990, now abandoned.

TECHNICAL FIELD OF THE INVENTION

This invention relates generally to the field of FFT architectures, and more particularly to a pipeline FFT architecture.

BACKGROUND OF THE INVENTION

The Fast Fourier Transform (FFT) is the generic name for a class of computationally efficient algorithms that implement the Discrete Fourier Transform (DFT). Until the advent of integrated circuit (IC) devices, the FFT could not be computed fast enough to be of use in the field of real time digital signal processing. Even now, faster and better FFT IC devices are still being pursued by many.

The FFT algorithm has been implemented in integrated circuits that reside on one or more physical devices to process signals in real time or near real time. For example, PDSP16510 manufactured by Plessey is implemented with one chip, and DASP manufactured by Honeywell is implemented with a two-chip set. Although the increased number of chips increases the parallelism in the computation and therefore the speed, disadvantages arise from the multiple-chip implementation.

Most system related failures are related to interconnection failures, including the interconnection between integrated circuit devices and the connection points between an integrated circuit device and the circuit board it resides on. Therefore the multiple-chip implementation inherently increases the possibility of interconnection failures.

Even though computation speed is dramatically improved by the use of more than one chip, the speed is still compromised because of the increased time it takes to transmit signals off-chip. Greater speeds could be realized if all circuits were contained within the space of one integrated circuit device. Therefore, a need has arisen for FFT architecture which provides for a fast FFT circuit. It is further desirable that the FFT architecture permit an FFT circuit implementation on one IC device.

The FFT algorithm is based on the decomposition of the DFT computation. There are two decomposition approaches: decimation-in-time (DIT) and decimation-in-frequency (DIF). The present FFT pipelined architecture is a fully parallel realization of the DIF radix-4 FFT butterfly computation. The pipelined architecture computes the FFT in the most time efficient manner and yields an exceptionally high throughput performance. Furthermore, a 1024-point 16-bit complex FFT circuit constructed in accordance with the present invention can presently be advantageously accommodated on a single chip having a 480 mils×480 mils die size.

The present invention provides for an FFT architecture and is directed to overcoming one or more of the problems as set forth above.

SUMMARY OF THE INVENTION

In accordance with the present invention, an FFT architecture is provided which substantially eliminates or reduces disadvantages and problems associated with prior architectures.

In one aspect of the present invention, a memory for storing complex number data is provided. A pipelined data path is coupled to the memory for accessing R complex number data therefrom, for computing a radix-R FFT butterfly, and storing R results from the FFT butterfly computation in the memory during one pipeline cycle.

In another aspect of the present invention, there is additionally a plurality of adders coupled to the memory for summing the R data and producing a plurality of sums. A plurality of multipliers are coupled to the plurality of adders for receiving the plurality of sums, multiplying the sums with a set of twiddle coefficients and producing a plurality of products. A plurality of pipeline buffers are further coupled interspersedly throughout the plurality of adders and multipliers.

An important technical advantage of the present invention is the exceptionally high throughput and speed realized by the present FFT pipelined architecture. During each pipeline cycle, a radix-R FFT butterfly is computed and its results stored.

Another important technical advantage of the present invention is the full realization of parallel computation in the architecture to increase throughput and speed. All memory access and computations are performed in parallel and in the most time efficient manner.

Yet another important technical advantage of the present invention arises from the physical implementation of the present invention on a single device. The problems associated with multiple-chip implementations, such as decreased speed and interconnection failures, are overcome.

BRIEF DESCRIPTION OF THE DRAWINGS

For a better understanding of the present invention, reference may be made to the accompanying drawings, in which.

DETAILED DESCRIPTION OF THE INVENTION

The FFT Compiler

Figure 1:
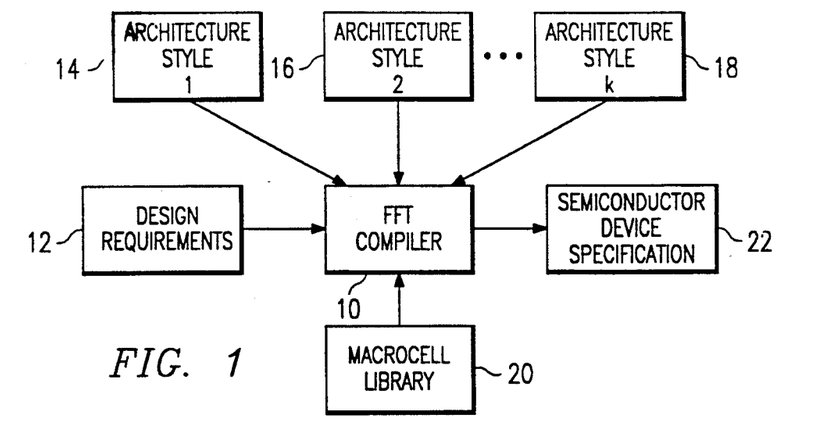
FIG. 1 is a top-level block diagram of the input and output parameters of a preferred embodiment of the FFT compiler constructed in accordance with the teachings of the present invention.

FIG. 1 provides an overview of the inputs and outputs of a preferred embodiment of an FFT compiler 10 constructed in accordance with the teachings of the present invention. FFT compiler 10 is capable of receiving a set of design requirements 12 specified by a user. The set of design requirements 12 may include specifications on problem size, word size, accuracy, throughput, and special pre- and post-processing operations. Based on design requirements 12, FFT compiler 10 selects from among a number of architecture styles 1, 2, ..., k 14-18 one which optimizes the resultant FFT device. The architecture styles offer space and time tradeoffs, which are dependent on user-specified design requirements 12. Additionally, sequential, parallel and pipelined architecture styles are among architecture styles 14-18. Note that although architecture styles 1, 2, ..., k 14-18 are shown explicitly outside the physical boundaries of FFT compiler 10, the architecture styles are in fact knowledge resident within FFT compiler 10.

Once an architecture style is selected, FFT compiler 10 generates an FFT circuit realization of the selected architecture style. The FFT circuit is generated by first generating large functional blocks of the circuit such as control circuits; memory blocks; clock signal generation circuits, drivers and distribution networks; memory addressing logic; and glue logic as known in the art. These large functional blocks are in turn implemented by generating smaller functional or logic blocks, such as adders, subtractors, multipliers, multiplexers, registers, latches and any combinatorial special function cells.

The FFT circuit realization is then implemented by using instances made from functional blocks stored in a macrocell library 20. Examples of the functional blocks or macrocells include adders, multipliers, registers, multiplexers, logic gates and the like. FFT compiler 10 subsequently generates a semiconductor device specification 22, or more commonly a net list, from which an implementation in silicon may be fabricated as known in the art. Semiconductor device specification 22 includes functional block specifications, interconnection between functional blocks, and layout of the functional blocks and interconnections.

Radix-4 Decimation-In-Frequency FFT

Figure 2:
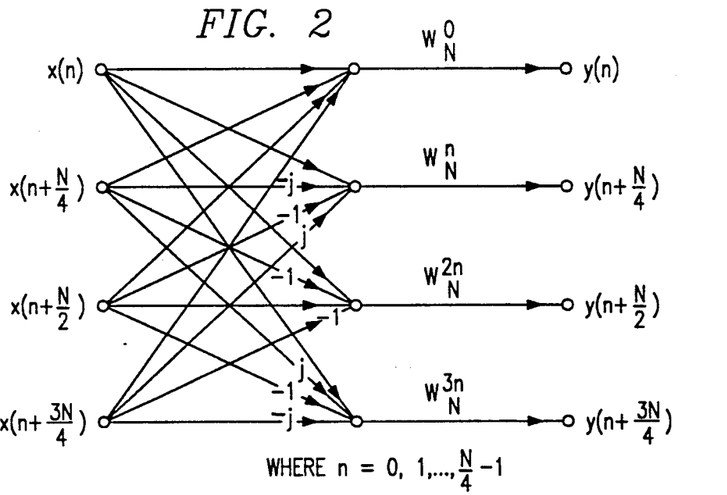
FIG. 2 is a flow graph representation of a radix-4 decimation-in-frequency (DIF) butterfly.

A more efficient method of computing the Discrete Fourier Transform (DFT) is the radix-4 decimation-in-frequency (DIF) FFT where an N-point FFT is reduced to the computation of four N/4-point FFTs. Referring to FIG. 2, a radix-4 DIF FFT flow diagram, more commonly known as a butterfly, is shown. The computation in the radix-4 DIF FFT butterfly may be represented in the following equations:

$$X(4r) = \sum_{n=0}^{(N/4)-1} [x(n) + x(n + N/4) + x(n + N/2) + x(n + 3N/4)] W_N^0 W_{N/4}^{nr}$$

$$X(4r + 1) = \sum_{n=0}^{(N/4)-1} [x(n) - jx(n + N/4) - x(n + N/2) + jx(n + 3N/4)] W_N^n W_{N/4}^{nr}$$

$$X(4r + 2) = \sum_{n=0}^{(N/4)-1} [x(n) - x(n + N/4) + x(n + N/2) - x(n + 3N/4)] W_N^{2n} W_{N/4}^{nr}$$

$$X(4r + 3) = \sum_{n=0}^{(N/4)-1} [x(n) + jx(n + N/4) - x(n + N/2) - jx(n + 3N/4)] W_N^{3n} W_{N/4}^{nr}$$

where $W_N = e^{-j2\pi/N}$, and $W_N$ is commonly known as the twiddle factor or twiddle coefficient. Note that each radix-4 DIF butterfly requires four complex data inputs and only three twiddle coefficients for its evaluation ($W_N^0$ is, by definition, 1), and produces four complex data outputs. The radix-4 DIF butterfly computation may also be partitioned into a scaling and sum section and a complex multiplication section.

Figure 3:
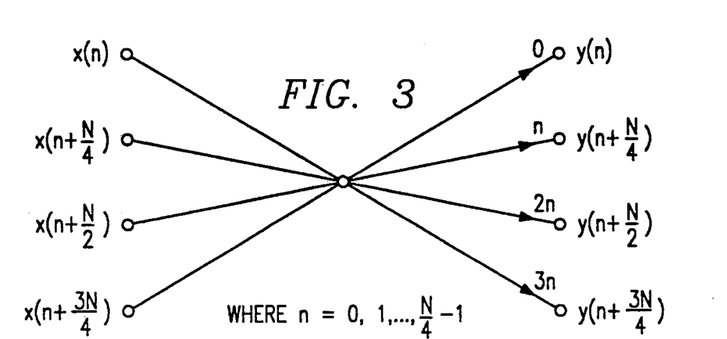
FIG. 3 is a simplified flow graph representation of a radix-4 DIF butterfly.

Accordingly, an N-point DFT may be evaluated as a collection of 4-point butterflies, where N is a power of four. FIG. 3 shows a simpler graphical representation of the radix-4 DIF FFT butterfly, which explicitly shows the four inputs x(n), x(n+N/4), x(n+N/2) and x(n+3N/4) and the four outputs y(n), y(n+N/4), y(n+N/2) and y(n+3N/4).

Figure 4:
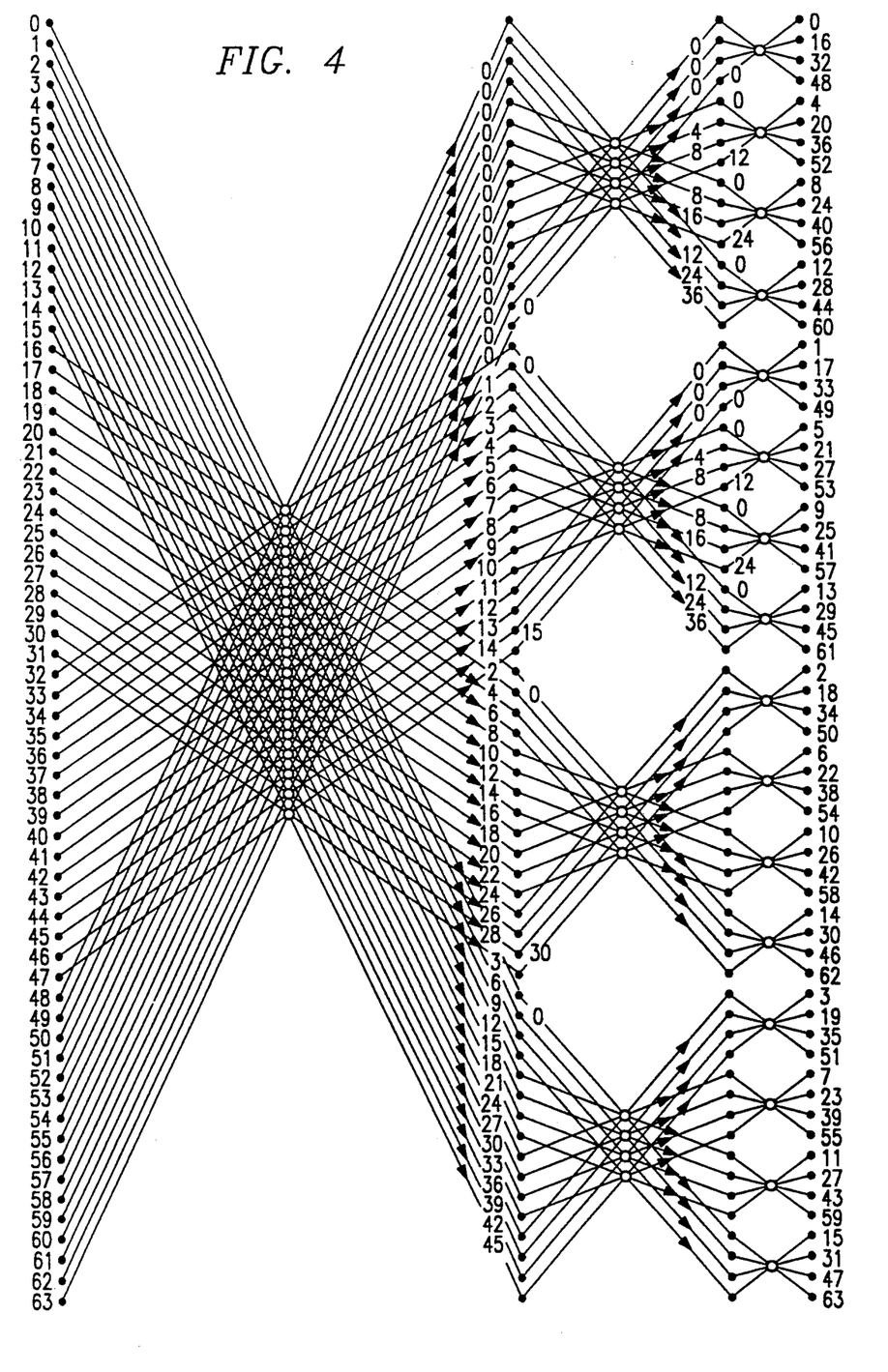
FIG. 4 is a flow graph representation of a 64-point radix-4 DIF FFT.

A graphical representation of a 64-point, radix-4 DIF FFT is shown in FIG. 4. Several characteristics of radix-4 DIF FFT are worth noting here. In an N-point, radix-4 FFT algorithm, the frequency decimation process passes through a total of M ranks, where $N=4^M$ with N/4 4-point butterflies per rank. The total number of butterflies in an N-point radix-4 DIF FFT is (N/4)log$_4$N. Therefore, in the example shown in FIG. 4, there are three ranks of 16 butterflies per rank with a total of 48 butterflies for N=64.

Note that the four data inputs for each butterfly and the four data outputs from each butterfly exhibit certain regularity in the positions from which they originate and terminate. For example, the first butterfly of rank one has four inputs from positions 0, 16, 32 and 48. The numerical spacing between the positions is 16. The first butterfly of rank two has four inputs from positions 0, 4, 8, 12, where the spacing is 4. For the butterflies in rank three, the spacing of the inputs becomes one. Therefore, it seems that there exists an incremental spacing of base four.

Further note that the N input data samples of the input signal x(n) is in normal ascending order, while the order of the N resultant frequency output samples seems scrambled. In fact, the output samples are in digit-reversed order in the quaternary system. For example, the data at location 30 (corresponding to number 132 in the quaternary system) exchanges positions with the data at location 45 (corresponding to quaternary number 231, digit-reversal of 132). For additional information on the FFT algorithm, please refer to textbooks on the topic of digital signal processing, such as *Digital Signal Processing* by Alan V. Oppenheim and Ronald W. Schafer.

Pipelined FFT Architecture

Figure 5:
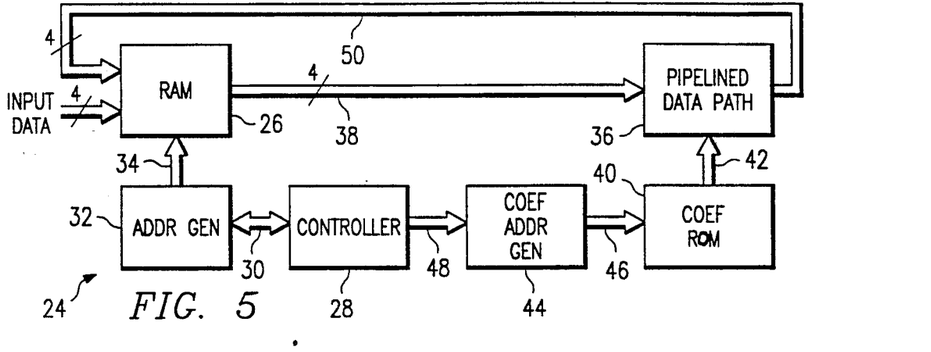
FIG. 5 is a simplified block diagram of a preferred embodiment of the FFT pipelined architecture constructed in accordance with the teachings of the present invention.

Referring to FIG. 5, a block diagram of a pipelined FFT architecture 24 for computing radix-4 DIF FFT is shown. Architecture style 24 is a pipelined architecture in which one butterfly computation is computed in one pipeline cycle. Input data are received and stored in a memory such as a RAM (random access memory) 26. A controller 28 supplies control signals on lines 30 which are coupled to an address generator 32. Address generator 32 is coupled to RAM 26 and supplies read and write addresses thereto on bus 34.

From RAM 26 four data are accessed and supplied to a pipelined data path 36 on lines 38. Pipelined data path 36 is capable of computing a radix-4 DIF butterfly, the computation consisting of 16 additions/subtractions and three complex multiplications. The complex multiplication procedure requires three complex twiddle coefficients, which are stored in preferably at least two coefficient ROMs (read-only memories) 40 and output to pipelined data path on lines 42. In order to read the twiddle coefficients substantially simultaneously, two ROMs are used for storage purpose thereof. If space allows, three ROMs may be used so that all three coefficients are accessed and available simultaneously. The addresses for reading the correct twiddle coefficients from coefficient ROMs 40 are generated in a coefficient address generator 44 and supplied to coefficient ROMs 40 on lines 46. Coefficient address generator 44 receives control signals from controller 28 on lines 48. The output of pipelined data path 36 is coupled to RAM 26 by lines 50, so that the output generated from each butterfly computation may be stored in RAM 26.

Figure 6:
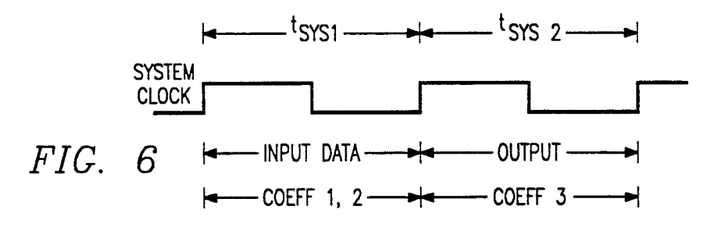
FIG. 6 is a timing diagram of the FFT pipelined architecture.

Referring to FIG. 6 for the timing of pipelined FFT architecture 24, two time periods, $t_{sys1}$ and $t_{sys2}$, consisting of two system clock periods are shown. During $t_{sys1}$, four input data are accessed from RAM 26 and placed at the input of pipelined data path 36. Concurrently, during $t_{sys1}$, the first two twiddle coefficients are read from ROMs 40 and also supplied to pipelined data path 36.

In the next period of the system clock, $t_{sys2}$, the third coefficient is read from ROMs 40 and also supplied to pipelined data path 36. During the same time period, $t_{sys2}$, the outputs become available at the output of pipelined data path 36 and are stored in RAM 26. It follows that a pipeline delay is two periods of the system clock, or ($t_{sys1}+t_{sys2}$), which will be referred to as one pipeline cycle.

Figure 7:
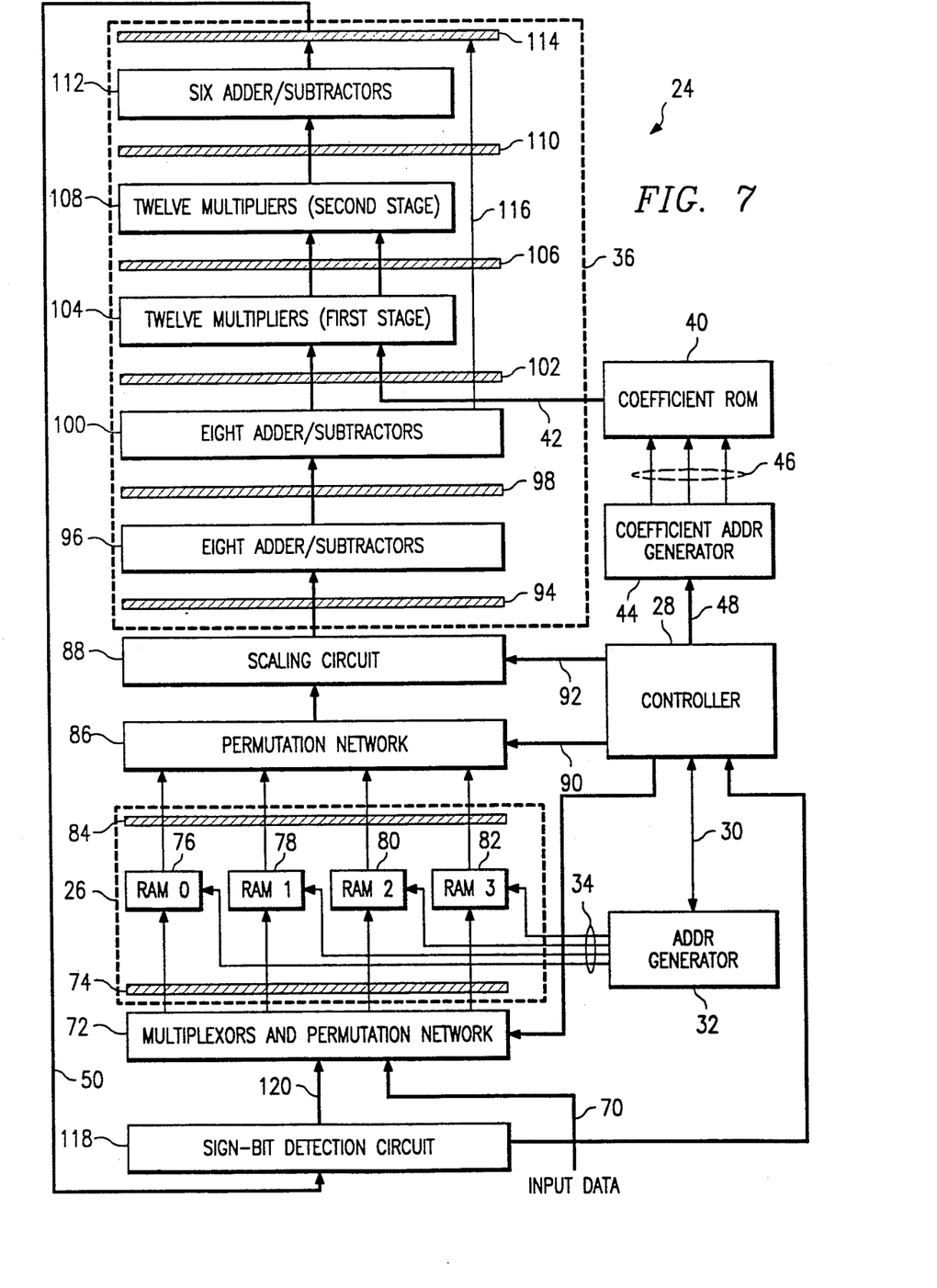
FIG. 7 is a more detailed block diagram of the preferred embodiment of the FFT pipelined architecture.

The details of architecture style 24 are shown in FIG. 7, where like elements are referred to by like numerals in FIG. 6. Input data has a path 70 into a permutation network 72. Permutation network 72 is coupled to the input of a pipeline register 74, the output of which is coupled to four banks of RAM 26: RAM0, RAM1, RAM2 and RAM3, 76–82, respectively. Address generator 32 is coupled to each bank of RAM 76–82 via lines 34. Address generator 32 is controlled by controller 28 and coupled thereto via lines 30. The output of RAM0, ... RAM3 76–82 are coupled to the input of a pipeline register 84, the output of which is coupled to the input of another permutation network 86. The output of permutation network 86 is coupled to the input of a scaling circuit 88, the output of which is coupled to the input of pipelined data path 36. The operation of both permutation network 86 and scaling circuit 88 are controlled by controller 28, the control signals being transported on lines 90 and 92, respectively.

Pipelined data path 36 includes a pipeline register 94. From pipeline register 94, the data are supplied to a bank of eight adders/subtractors 96. The output of adders/subtractors 96 is coupled to the input of yet another pipeline register 98. Subsequently, the output of pipeline register 98 is coupled to another eight adders/subtractors 100, and the output of adders/subtractors 100 is coupled to a pipeline register 102. Coefficient address generator 44, coupled to controller 28 via lines 48, generates addresses on lines 46 for accessing coefficient ROMs 40. The output of coefficient ROMs 40 is coupled to pipeline register 102 via lines 42. Three of the four outputs of pipeline register 102 are coupled to a first stage of twelve multipliers 104, followed by a pipeline register 106 and a second stage of twelve multipliers 108. The output of multipliers 108 is coupled to a pipeline register 110, followed by six adders/subtractors 112 and another pipeline register 114. Note that a data path 116 supplies one of the four outputs from pipeline register 102 to subsequent pipeline registers 102, 106, 110 and 114 without passing through multipliers 104 and 108 and adders/subtractors 112. The output of pipeline register 114 is coupled to a sign-bit detection circuit 118 via lines 50, the output of which is coupled to the input of permutation network 72 via lines 120.

The operations of pipelined FFT architecture 24 will become more apparent from the discussion below on the major components thereof.

Address Generator

The address generator 32 must ensure that the correct data is presented to pipelined data path 36 at the beginning of each pipeline cycle, and that the output data from pipelined data path 36 is stored in RAM 26 at the end of each pipeline cycle. As discussed above, each radix-4 DIF butterfly computation requires four complex data inputs. RAM 26 has four banks RAM0 to RAM3 76–82 so that the four data required for each butterfly computation can be extracted concurrently from RAM banks 76–82. During the same pipeline cycle, the output data from pipelined data path 36 must be stored in the correct bank of RAM 26 to be ready for subsequent computations, even though the data are shuffled when going from rank to rank during the computations.

Figure 8:
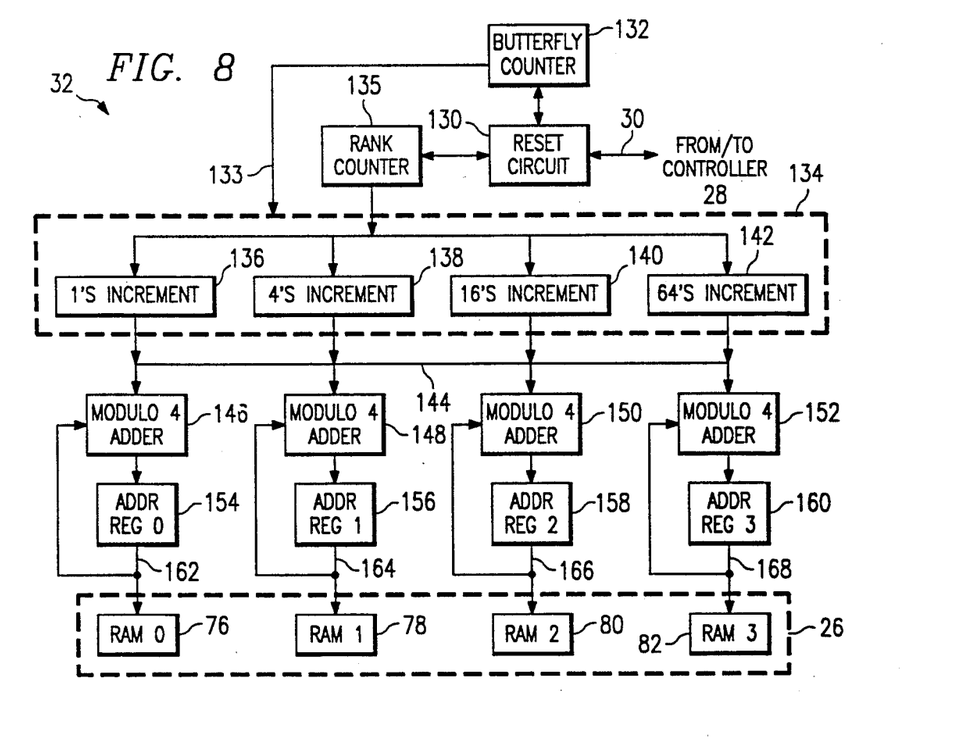
FIG. 8 is a block diagram of a preferred embodiment of the data address generator.

Referring to FIG. 8, a block diagram of address generator 32 constructed in accordance with the present invention is shown. A reset circuit 130 receives timing and control signals from controller 28 on lines 30. Reset circuit 130 is coupled to a butterfly counter 132, whose carry values are output on lines 133 and provided to an increment circuit 134. The carry values on line 133 consist of the carry value into the least significant bit of butterfly counter 132 and the second carry value, the fourth carry value, etc. In other words, only every other carry value from the binary counter elements is output onto lines 133, since radix-4 DIF FFT is being implemented. If radix-2 FFT is being implemented, every carry value is needed. Similarly, if radix-8 FFT is being implemented, only every third carry value is required to generate the address incremental values. Butterfly counter 132 is constructed from a plurality of cascaded binary counter elements (not shown), each receiving a carry signal from its less significant counter element. The construction of such counters are known in the art of digital logic circuits, the details of which need not be discussed herein.

A rank counter 135 is coupled to reset circuit 130 and is further coupled to increment circuit 134 composed of circuits of varying incremental values which increase by base four. These circuits compute the incremental address values for each carry line coming from butterfly counter 132. For N=1024 and radix-4, increment circuit 134 includes a one's increment circuit 136, a four's increment circuit 138, a 16's increment circuit 140 and a 64's increment circuit 142. The output of increment circuits 136-142 are summed and connected to a common bus 144, which is coupled to one input of four modulo 4 adders 146-152. The output of modulo 4 adders 146-152 are connected to respective address registers 154-160. The output 162-168 from each of address registers 154-160 is fed back to the other input of respective modulo 4 adders 146-152. The address register outputs 162-168 are further coupled to RAM banks 76-82 of RAM 26, respectively.

In operation, butterfly counter 132 and rank counter 135 keep track of which butterfly of which rank is currently being computed, so that the RAM read and write addresses may be derived therefrom. Both counters 132 and 135 are reset or initialized by reset circuit 130, which receives instructions from controller 28 on line 30. The count from rank counter 135 is supplied to increment circuits 136-142. In addition, the carry values from butterfly counter 132 are supplied to increment circuits 136-142. The embodiment shown in FIG. 8 is for a 1024-point radix-4 DIF FFT, where the increment circuits implement one's, four's, 16's and 64's increments.

Address registers 154-160 are initialized with the addresses of the four data for the first butterfly in each rank. Depending on the rank, the initial addresses may vary. In the preferred embodiment of the present invention, the initial read and write addresses in base four for each branch of a butterfly in a rank are shown in TABLE 1. Note that the last base 4 digit corresponds to the RAM number used for the read/write operation.

TABLE 1

| RANK 1 | $00000_4$ | $11111_4$ | $22222_4$ | $33333_4$ |
|---|---|---|---|---|
| RANK 2 | $00000_4$ | $01111_4$ | $02222_4$ | $03333_4$ |
| RANK 3 | $00000_4$ | $00111_4$ | $00222_4$ | $00333_4$ |
| RANK 4 | $00000_4$ | $00011_4$ | $00022_4$ | $00033_4$ |
| RANK 5 | $00000_4$ | $00001_4$ | $00002_4$ | $00003_4$ |

For subsequent butterfly computations, certain of the incremental amounts generated in increment circuit 134 in response to the carry values from butterfly counter 132 are summed and supplied to each modulo 4 adder 146-152. For example, if the least significant carry value into butterfly counter 132 is one, the second carry value and the third least significant carry value in butterfly counter 132 are zero and one, respectively, then the incremental amounts in 1's and 16's increment circuit 136 and 140 are summed. Shown in TABLES 2 and 3 are the read and write incremental values for ranks 1-5 for a 1,024-point FFT. Modulo 4 adders 146-152 adds the addresses in address registers 154-160 and the incremental values as supplied by increment circuit 134. The incremented addresses are output onto lines 162-168 and supplied to RAM banks 76-82, according to the last base 4 digit of the address.

TABLE 2

| READ | 1's | 4's | 16's | 64's |
|---|---|---|---|---|
| RANK 1 | 00001 | 00011 | 00111 | 01111 |
| RANK 2 | 00001 | 00011 | 00111 | [11111] |
| RANK 3 | 00001 | 00011 | [01111] | 10000 |
| RANK 4 | 00001 | [00111] | 01000 | 10000 |
| RANK 5 | [00011] | 00100 | 01000 | 10000 |

TABLE 3

| WRITE | 1's | 4's | 16's | 64's |
|---|---|---|---|---|
| RANK 1 | 00001 | 00011 | 00111 | 01111 |
| RANK 2 | 00001 | 00011 | 00111 | [10000] |
| RANK 3 | 00001 | 00011 | [01000] | 10000 |
| RANK 4 | 00001 | [00100] | 01000 | 10000 |
| RANK 5 | [00010] | 00100 | 01000 | 10000 |

Figure 9:
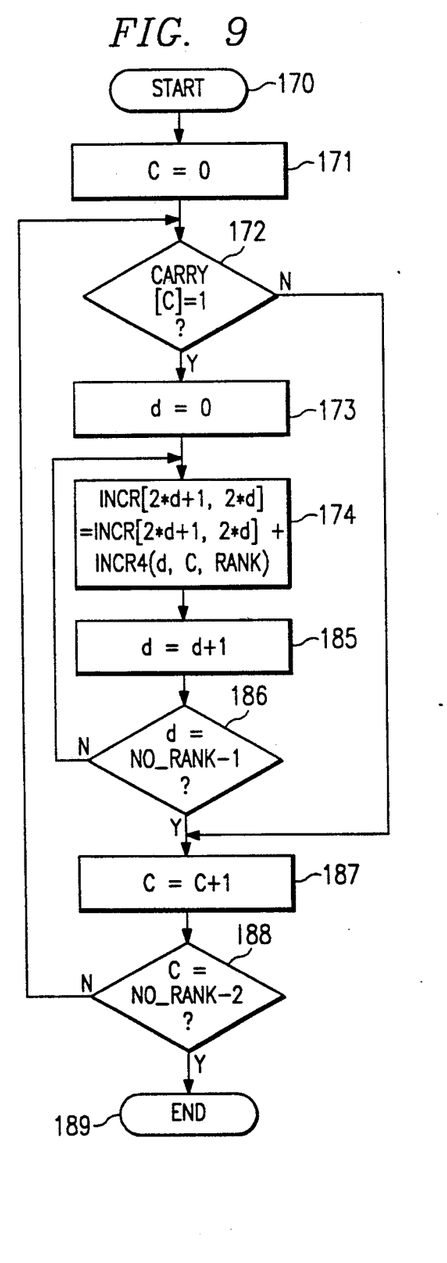
FIG. 9 is a first flowchart representation of a portion of the data address generator.
Figure 10:
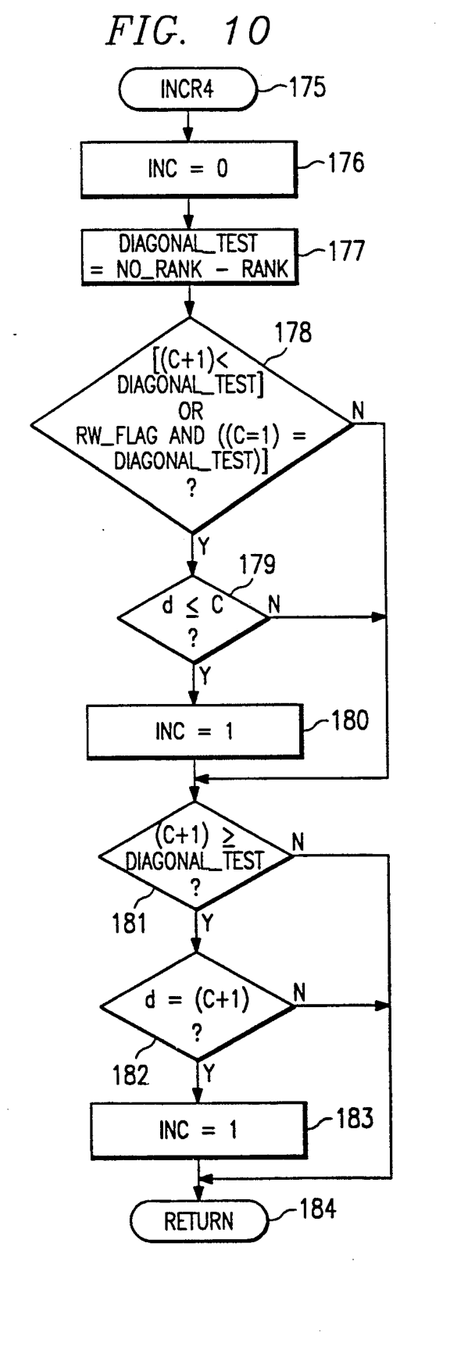
FIG. 10 is a second flowchart representation of a portion of the data address generator.

The logic behind the generation of the data read and write address increments shown in TABLES 2 and 3 may be summarized in the form of a flowchart beginning in block 170 as shown in FIGS. 9 and 10. An index c to an array CARRY is initialized to zero in block 171. The values indexed by c in the CARRY array represent the carry values in butterfly counter 132 of address generator 32. In block 172 the value in the CARRY array at location c, or CARRY[c], is compared to one. If the value at CARRY[c] is equal to one, then a loop count d is initialized to zero in block 173. If the comparison in block 172 is false, then execution skips forward, and no increments are generated in the corresponding increment circuit 136-142.

Following block 173, a statement:

$$INCR[2*d+1,2*d] = INCR[2*d+1,2*d] + INCR4(d,c,rank)$$

is executed in block 174. INCR is an array which contains incremental values for each address digit. Since each digit represents two binary bits of address, INCR[1,0] to INCR[9,8] represents digits 0 to 4. INCR4 is a subroutine which determines the increment for each address digit for a certain rank. The statement in block 174 calls the INCR4() subroutine while passing three arguments: d, c, and rank to it.

Referring to FIG. 10, subroutine INCR4 begins in block 175. In block 176, a variable INC is initialized to zero. Subsequently in block 177, the rank value passed to the INCR4 subroutine is subtracted from the total number of ranks, NO-RANK, and the result is set equal to a variable name DIAGONAL_TEST. If value [(c+1)<DIAGONAL_TEST] OR [RW_FLAG AND ((c+1)=DIAGONAL_TEST)] is true in block 178, then d is compared with c in block 179. The RW-FLAG is one for read and zero for write which accounts for the difference between read address increments and write address increments in TABLES 2 and 3. In block 179, it is determined whether d is less than or equal to c. If the comparison is positive in block 179, then the variable INC is set to equal one in block 180 and execution proceeds to block 181. If the conditions in either block 178 or block 179 are false, then execution skips to block 181, where the value (c+1) is compared to DIAGONAL_TEST. If (c+1) is greater than or equal to DIAGONAL_TEST, then the value of d is compared with (c+1) in block 182. If d is equal to (c+1), then the variable INC is set to equal to one in block 183, else execution returns in block 184. Similarly, if the comparisons in either block 181 or 182 are false, then execution skips to RETURN block 184.

Upon returning from the INCR4 subroutine, the value of INC is summed with INCR[2*d+1,2*d] in block 174. Subsequently, the value of d is incremented by one in block 185, and in block 186 it is checked to determine whether d is equal to the total number of ranks, NO-RANK, minus one. If not, execution returns to block 174, if so, execution proceeds to block 187, where the value c is incremented by one. In block 188, it is determined whether c is equal to NO-RANK minus two, if so, execution ends in block 189, else execution loops back to block 172.

The logic in the flowcharts in FIGS. 9 and 10 generates the incremental values shown in tabular format in TABLES 2 and 3. In order to understand that logic, several items are worth noting in TABLES 2 and 3. TABLE 2 shows the read address increments for ranks 1 through 5. Note that the entries on the diagonal have been bracketed. Note further that the read increment entries above the bracketed entries on the diagonal are nothing but successive left-shifted bits, as one goes from one's increment to 64's increment, with the bits shifted in being ones. For example, for rank 1, the entries are successively, 00001, 00011, 00111, and 01111. On the diagonal, however, the entries become the left-shifted version of the entries above each respective diagonal entry, again with the bit shifted in being ones. For example, for rank 3, the diagonal entry is 01111, which is 00111 shifted left one bit, with a one shifted in. Below the diagonal, the entries are equal to the entry above the diagonal entry plus one. For example, for rank 4, the entry 01000 is the entry 00111 above the diagonal entry 01111 plus one.

The pattern changes slightly for write address increments. Referring to TABLE 3, the entries above the diagonal are also successively left-shifted as one goes from one's increment to 64's increment in each rank. The diagonal entries, however, are now the same as the below the diagonal entries which are equal to the entry above the diagonal entries plus one. For example, for rank 3, the diagonal entry 01000 is the entry above the diagonal entry, 00111, plus one. The entries below the diagonal entries are equal to the diagonal entries for each incremental value. For example, for 16's increment, entries for ranks 3-5 are all 01000.

With the above-described patterns in mind, the logic behind FIGS. 9 and 10 should be obvious. The subroutine INCR4 tests for whether the current increment desired falls on the diagonal by determining DIAGONAL_TEST in block 177. It also determines whether read or write address increments are currently being computed by testing a flag RW_FLAG. Furthermore, depending on the values of c and d, the variable INC is set to equal one, or left to equal zero. The initial addresses for both read and write are the same, as shown in TABLE 1. To further illustrate the address generator and method, shown in TABLES 4 and 5 are read and write addresses, respectively, for the second and third butterflies in ranks 1-5.

TABLE 4

READ (rank, butterfly)

|       | (1,2) | (2,2) | (3,2) | (4,2) | (5,2) |
|-------|-------|-------|-------|-------|-------|
| ADDR1 | 00001 | 00001 | 00001 | 00001 | 00011 |
| ADDR2 | 11112 | 01112 | 00112 | 00012 | 00012 |
| ADDR3 | 22223 | 02223 | 00223 | 00023 | 00013 |
| ADDR4 | 33330 | 03330 | 00330 | 00030 | 00010 |

TABLE 4-continued

READ (rank, butterfly)

|       | (1,3) | (2,3) | (3,3) | (4,3) | (5,3) |
|-------|-------|-------|-------|-------|-------|
| ADDR1 | 00002 | 00002 | 00002 | 00002 | 00022 |
| ADDR2 | 11113 | 01113 | 00113 | 00013 | 00023 |
| ADDR3 | 22220 | 02220 | 00220 | 00020 | 00020 |
| ADDR4 | 33331 | 03331 | 00331 | 00031 | 00021 |

TABLE 5

WRITE (rank, butterfly)

|       | (1,2) | (2,2) | (3,2) | (4,2) | (5,2) |
|-------|-------|-------|-------|-------|-------|
| ADDR1 | 00001 | 00001 | 00001 | 00001 | 00010 |
| ADDR2 | 11112 | 01112 | 00112 | 00012 | 00011 |
| ADDR3 | 22223 | 02223 | 00223 | 00023 | 00012 |
| ADDR4 | 33330 | 033330 | 00330 | 00030 | 00013 |

|       | (1,3) | (2,3) | (3,3) | (4,3) | (5,3) |
|-------|-------|-------|-------|-------|-------|
| ADDR1 | 00002 | 00002 | 00002 | 00002 | 00020 |
| ADDR2 | 11113 | 01113 | 00113 | 00013 | 00021 |
| ADDR3 | 22220 | 02220 | 00220 | 00020 | 00022 |
| ADDR4 | 33331 | 03331 | 00331 | 00031 | 00023 |

Permutation Networks

Figure 11:
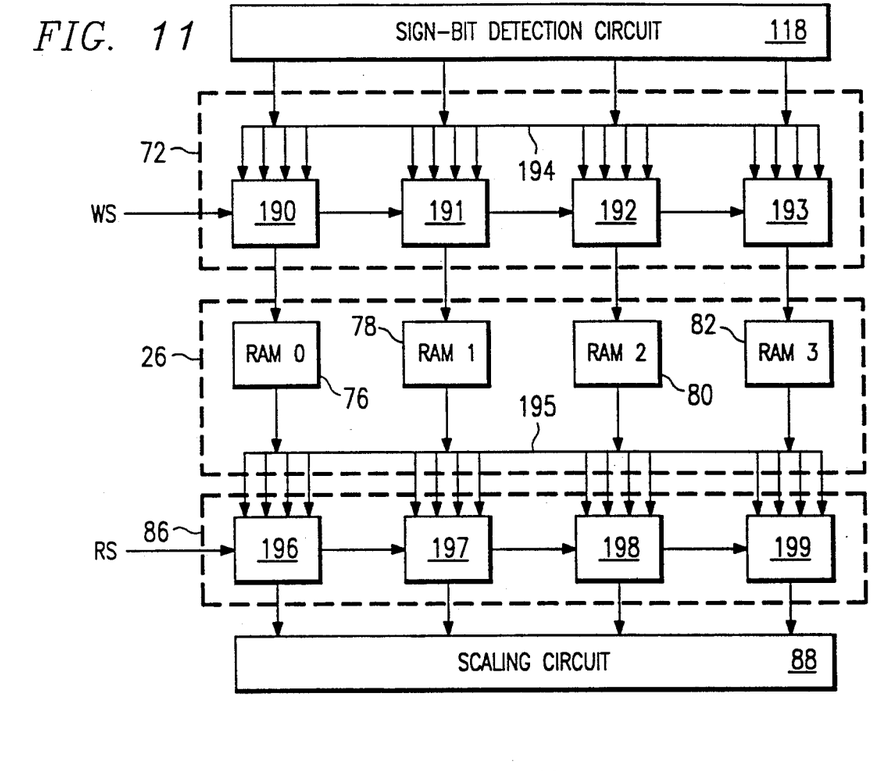
FIG. 11 is a block diagram of a preferred embodiment of the permutation networks and surrounding circuitry.

Referring to FIG. 11, permutation networks 72 and 86 are positioned at the input and output sides of RAM banks 76-82 of RAM 26. Permutation network 72 is constructed with a plurality of four-to-one multiplexers 190-193 coupled to the output of sign-bit detection circuit 118 via a bus 194. Multiplexers 190-193 receive control signals WS from the lowest base 4 digit of the write addresses. The output of multiplexers 190-193 are coupled to the inputs of RAM banks 76-82, respectively. The outputs of RAM banks 76-82 are coupled to a second permutation network 86 constructed in like manner as permutation network 72 via a bus 195. Permutation network 86 consists of four-to-one multiplexers 196-199, which receive control signals RS from the lowest base 4 digit of the read addresses. The outputs of multiplexers 196-199 are coupled to scaling circuit 88.

It is important to note that each multiplexer block 190-193 and 196-199 shown in FIG. 11 is representative of a plurality of multiplexers which are required to multiplex all bits of data. For example, in the preferred embodiment where data are 32 bits (16 bits real and 16 bits imaginary), each multiplexer 190-193 and 196-199 is actually 32 four-to-one multiplexers.

In operation, during the first half of a pipeline cycle, one data is read from each RAM bank 76-82 in accordance with the data address generator and method as described above. The two least significant bits of each generated read address for each RAM bank 76-82 are used to control multiplexers 196-199, respectively, as the RS signals. Therefore, in actuality, the RS signals consist of eight individual signals, two for each multiplexer 196-199. Multiplexers 196-199 then multiplex one of the four data present at the input to the output, and are received by scaling circuit 88.

Permutation network 72 operates much in the same fashion as permutation network 86. During the second half of a pipeline cycle, four data are present on bus 194 from sign-bit detection circuit 118. Multiplexers 190-193 are under the control of signals WS consisting of the two least significant bits of each write address, which multiplex one of the four data present at the input to the output. The data are then received by RAM banks 76-82.

Sign-Bit Detection Circuit and Scaling Circuit

As discussed previously in conjunction with FIG. 4, in an N-point, radix-4 FFT algorithm, the frequency decimation process passes through a total of M ranks ($N=4^M$), where the output data from one rank become the input data of the next.

In FFT pipeline architecture 24, as the four butterfly output data leave the last pipeline register 114 in the pipeline data path 36, their widths have essentially doubled from the multiplication process. Each time the DIF process passes through yet another rank, the data size doubles. To prevent data overflowing the capacity of the hardware, the less significant bits in butterfly output data are truncated or right shifted to fit the prescribed width of RAM 26. Conditional scaling is then applied at the beginning of the next rank to improve the dynamic range of subsequent butterfly computations. This conditional scaling is realized by the cooperation of sign-bit detection circuit 118 and scaling circuit 88.

Sign-bit detection circuit 118 determines the largest truncated output data in a rank before the data are saved in RAM 26. This determination entails detecting the number of duplicated sign bits in the largest data value in the rank, which yields the number of bits the data may be scaled or left shifted to improve the dynamic range of the data. In other words, sign-bit detection circuit 118 determines the number of bits all the output data from a rank are to be scaled up, and all the output data from the same rank are scaled up by the same number of bits.

When the computations begin for the next rank, the output data of the previous rank, which were stored in RAM 26, become the input data and are passed to scaling circuit 88. Scaling circuit 88 left shifts the data by the number of bits determined by sign-bit detection circuit 118, and these scaled data are then passed to pipelined data path 36.

Coefficient Address Generator

In each radix-4 butterfly computation, in addition to the four complex data, three complex twiddle coefficients are also required to produce the output data. The twiddle coefficients for angles between 0 and 45 degrees are calculated with known DSP techniques and are stored in coefficient ROMs 40. The memory in coefficient ROMs 40 is duplicated to form two copies of the twiddle coefficients.

Figure 12:
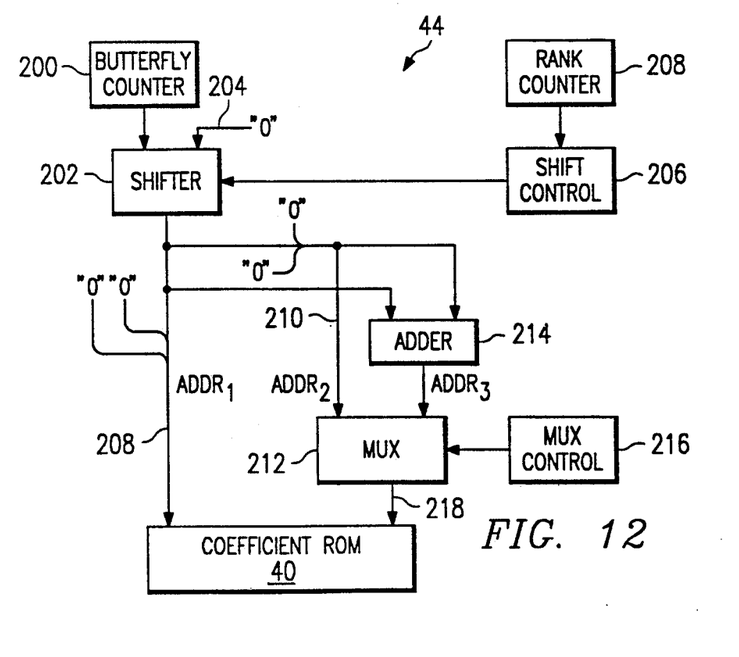
FIG. 12 is a block diagram of a preferred embodiment of the coefficient address generator.

Referring to FIG. 12, a block diagram of coefficient address generator 44 is shown. The output of a butterfly counter 200 is coupled to the input of a shifter 202. Shifter 202 may be implemented with a shift register or a series of muliplexers connected to perform the shift function. Shifter 202 is also arranged to receive a number of zeros as input on lines 204. Shifter 202 is coupled to a shift control 206, which controls its shift function. Shift control 206 is coupled to a rank counter 208 for receiving input therefrom. Note that butterfly counter 200 and rank counter 208 perform identical functions as butterfly counter 132 and rank counter 135 of FIG. 8. Therefore, only one butterfly counter and one rank counter may be implemented in controller 28 and their outputs routed to both address generator 32 and coefficient address generator 44.

The output of shifter 202 is subsequently manipulated to form coefficient addresses $ADDR_1$, $ADDR_2$ and $ADDR_3$. For the formation of $ADDR_1$ on address lines 208, two zeros are added to form the uppermost two bits. Address lines 208 are coupled to coefficient ROMs 40. For forming $ADDR_2$ on lines 210, one zero is added to form the uppermost bit and another zero is added to form the lowermost bit. $ADDR_2$ is then fed into the input of a multiplexer (MUX) 212. $ADDR_3$ is formed by adding $ADDR_1$ and $ADDR_2$ in an adder 214, its input connected to lines 208 and 210. The output of adder 214 is coupled to the other input of multiplexer 212. Multiplexer 212 is coupled to a MUX control 216, and the output thereof is supplied on address lines 218 coupled to coefficient ROMs 40.

The coefficient addresses generated by coefficient address generator 44 for each butterfly computation may be expressed in equation form as:

$$ADDR_1 = [4^{r-1}(b \bmod N/4^4)] \bmod N,$$

$$ADDR_2 = [2*4^{r-1}(b \bmod N/4^4)] \bmod N, \text{ and}$$

$$ADDR_3 = [3*4^{r-1}(b \bmod N/4^4)] \bmod N,$$

where
N is the number of points,
b is the butterfly count,
r is the rank count, and
$n = \log_2 N$.

From the foregoing equations, it may be seen that $ADDR_2$ is twice that of $ADDR_1$ and $ADDR_3$ is three times that of $ADDR_1$. In other words, $ADDR_2$ added to $ADDR_1$ yields $ADDR_3$. This is performed by adder 214. In operation, the butterfly count from counter 200 in (n−2) bits is received by shifter 202, forming the upper (n−2) bits therein. 2(r−1) bits of zeros are also received by shifter 202 on lines 204, which form the lower 2(r−1) bits in shifter 202. Shift control 206 computes 2(r−1) and instructs shifter 202 to shift left by this amount. In effect, the left shift by 2(r−1) bits multiplies the number in shifter by $4^{r-1}$. The output of shifter 202 consists of the lower (n−2) bits, which in effect yields $[4^{r-1}(b \bmod N/4^r)]$. The subsequent addition of two bits with value zero yields addresses of n bits.

Referring back to FIG. 6 for the timing of coefficient access, it may be seen that three coefficient accesses are required within one pipeline cycle. This is accomplished by accessing the first and second coefficients for butterfly first and second branches in the first half of the pipeline cycle, and then accessing the third coefficient in the second half of the same pipeline cycle. Multiplexer 212 is thus controlled by MUX control 216 to provide the multiplexing of $ADDR_2$ and $ADDR_3$, so that $ADDR_2$ is available in the first half of the pipeline cycle and $ADDR_3$ is available in the second half of the cycle.

Adders and Subtractors

Figure 13:
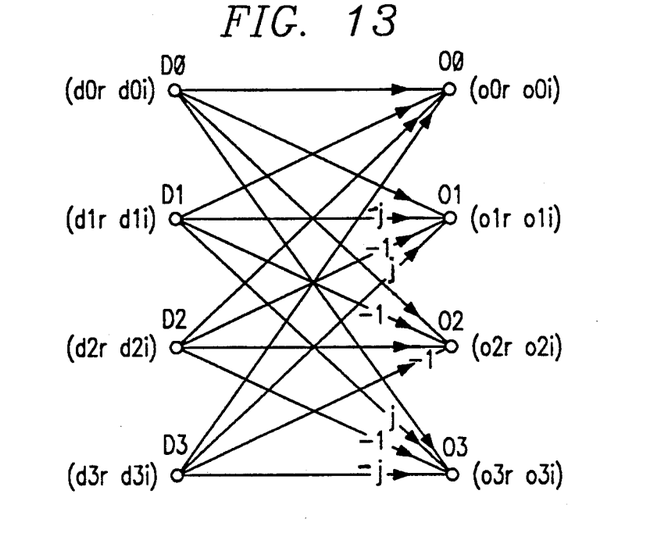
FIG. 13 is a portion of a radix-4 DIF butterfly showing the adding and subtracting computations for the real and imaginary parts of the input data.

Referring to FIG. 13, a portion of the radix-4 DIF FFT butterfly diagram is shown. Prior to multiplying to the complex twiddle coefficients, the four complex data D0-D3 are added and/or subtracted to form output data O0-O3 as shown. Values 1, −1, j and −j shown on those branches indicate multipliers. Since each complex data D0-D3 has a real part D0r-D3r and an imaginary part D0i-D3i, the total number of additions and subtractions to compute O0-O3 is 16.

Figure 14:
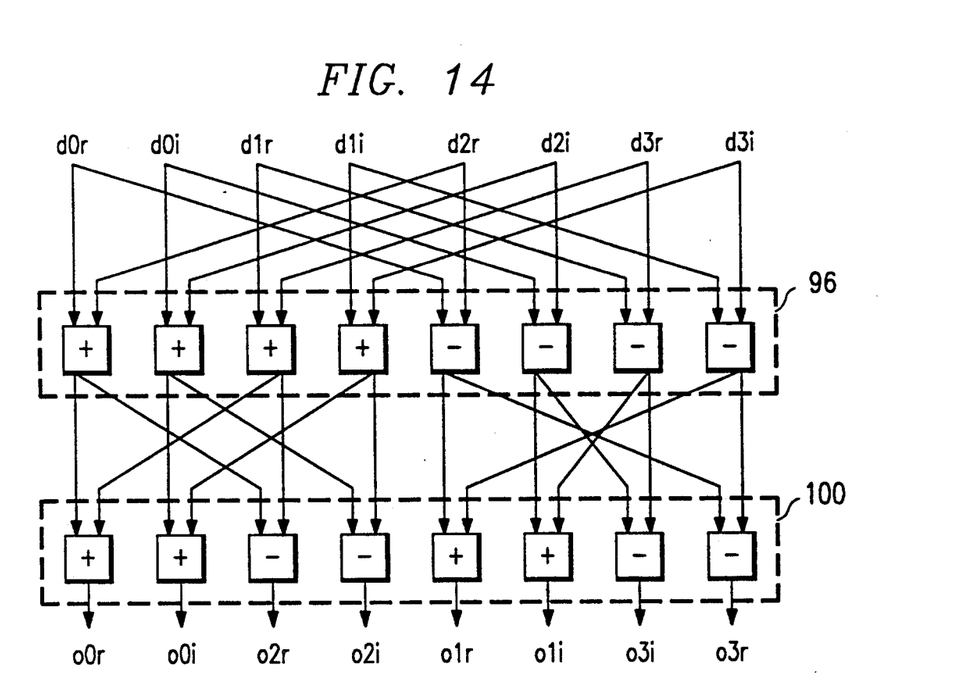
FIG. 14 is a block diagram showing the sixteen adders and subtractors required for the most time efficient implementation of the add/subtract computation in a butterfly in the preferred embodiment.

In order to compute the 16 additions and subtractions for each butterfly in a time efficient manner, 16 adders or subtractors are required as shown in FIG. 14. Therefore, FFT architecture includes a first bank of eight adders/subtractors 96 and a second bank of eight adders/subtractors 100 to perform the first computation portion of a radix-4 butterfly.

Interleaved Complex Multiplier

In the second computation portion of a radix-4 butterfly, the output data O0–O3 from adders/subtractors 96 and 100 are multiplied with complex twiddle coefficients. Recall that since $W_N^0$ is, by definition, equal to one, only three complex multiplications are actually performed. Each complex multiplication may be represented as:

$$M+jN=(A+jB)*(X+jY),$$

or equivalently, as the following tow equations:

$$M=A*X-B*Y, \text{ and}$$

$$N=A*Y+B*X,$$

where M is the real part of the complex product, and N is the imaginary part of the complex product. It is evident from the foregoing that one complex multiplication function consisting of multiplying two complex numbers is, in effect, four separate multiplications, one addition and one subtraction. Therefore, the three twiddle coefficient multiplications are equivalent to a total of twelve multiplications, three additions and three subtractions. Therefore, the most time efficient implementation uses twelve multipliers, three adders and three subtractors.

Figure 15:
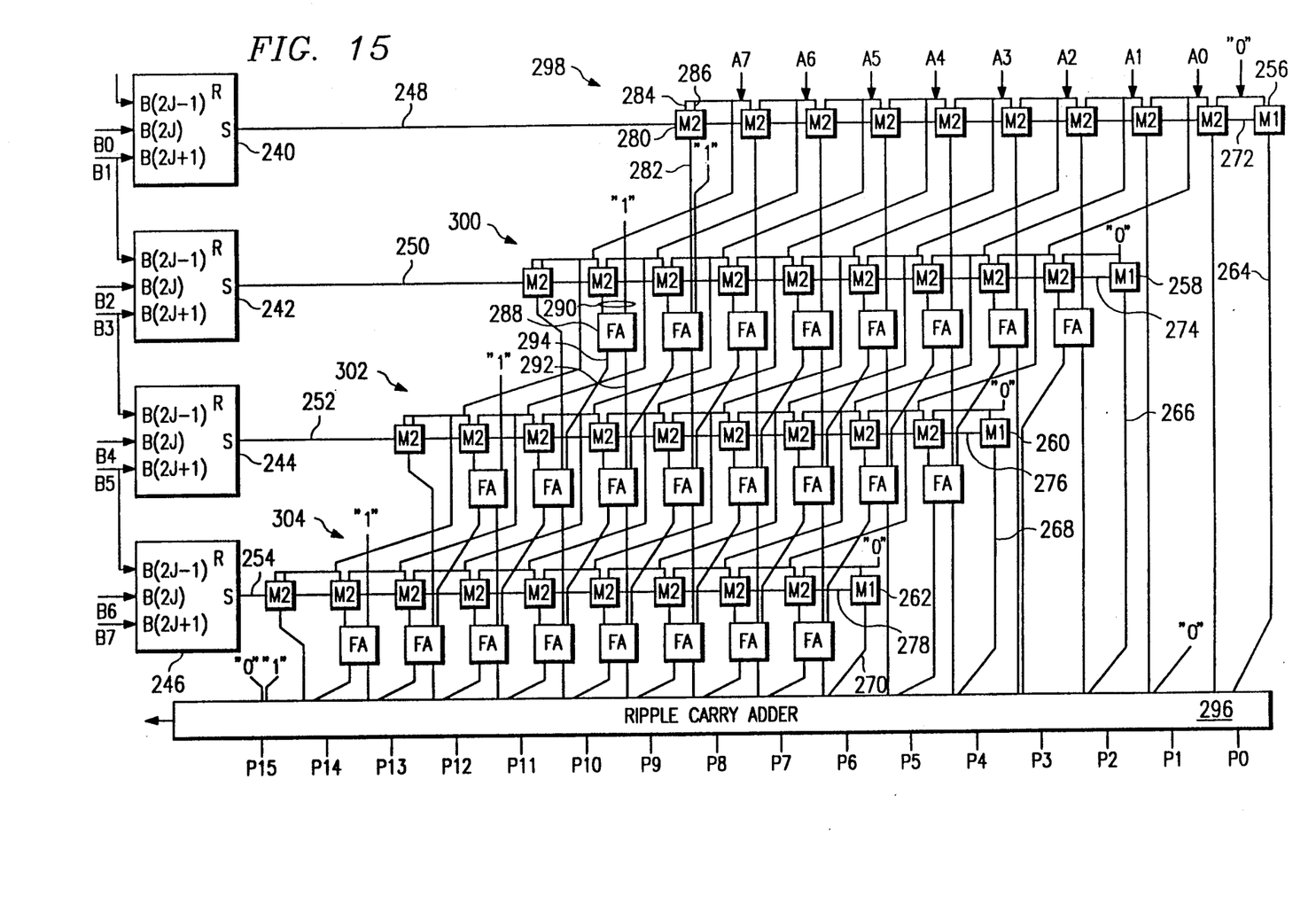
FIG. 15 is a block diagram of a Booth recoding multiplier as known in the art.

FIG. 15 shows an eight-bit multiplier, multiplying A7–A0 and B7–B0 and producing a product shown as P15–P0. In the preferred embodiment of the present invention, multipliers of the Booth recoding type as shown in FIG. 15 are used. Since the Booth recoding algorithm is well known in the art of logic circuit design, the details of the algorithm will not be discussed herein. However, references such as *Digital CMOS Circuit Design* by Marco Annaratone may be consulted for details.

In a Booth recoding multiplier, there are four basic building blocks: R, M1, M2, FA. Recoders, R, 240–246 receive inputs B(2J −1), B(2J) and B(2J+1) and produce a sign bit S on lines 248–254. Ml blocks 256–162 generate a "one" at the output lines 264–270 depending on the state of the select lines 272–278. An M2 block, such as block 280, is basically a multiplexer (MUX) which produces at the output 282 one of the inputs 284 and 286, depending on the select input 248. Lastly, an FA, or full adder, such as block 282, adds two numbers present at its input 290, produces a sum on line 292 and generates a carry signal on line 294. A ripple carry adder 296 is used to sum all the partial products to form the final product P15–P0. Note that for eight-bit multiplicand and multiplier, there are four stages 298–304 in the multiplier circuit.

Figure 16:
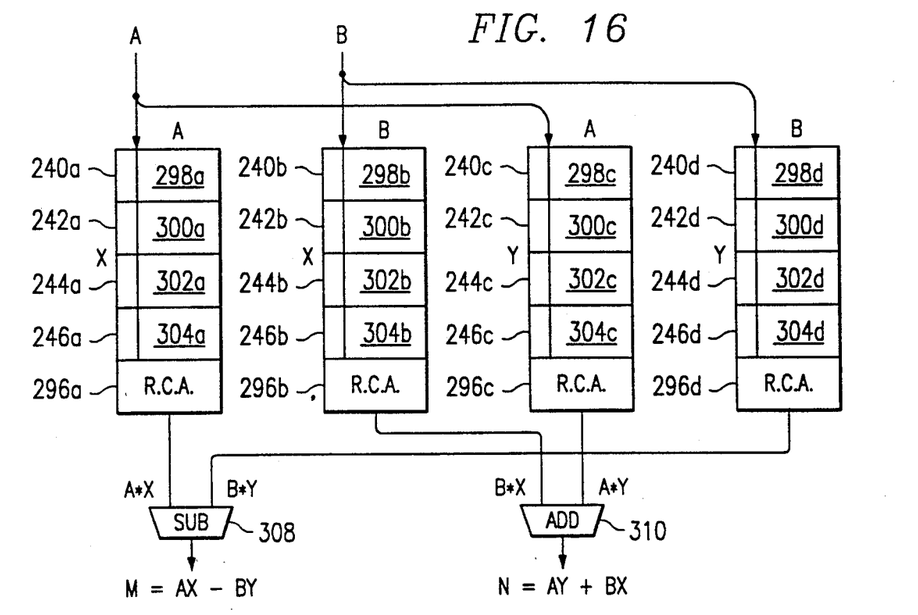
FIG. 16 is a block diagram of a layout of the Booth recoding multiplier, for multiplying two complex numbers for illustrating the problems associated therewith.

From the foregoing, it is evident that even though the Booth recoding algorithm decreases the number of steps required in the multiplication function, the resultant multiplier circuit and interconnections are still somewhat cumbersome. For the purpose of illustration, four such multipliers, each with four stages 298a–d to 304a–d, Booth recoders 240a–d to 246a–d, and a ripple carry adder (R.C.A.) 296a–d for performing one complex multiplication may be arranged as shown in FIG. 16. In addition, a subtractor 308 and an adder 310 further receive (A*X), (A*Y), (B*X) and (B*Y) to compute the real part M and imaginary part N. Such placement presents serious routing problems not only between the input quantities A, B, X and Y and the various stages of the multipliers, but also from each multiplier to subtractor 308 and adder 310. As discussed above, twelve multipliers are required to achieve the most time efficient implementation of the radix-4 FFT computation. As a result, the total layout area of the multipliers may cause the overall size of the FFT architecture to exceed the area available on a typical integrated circuit device.

Figure 17:
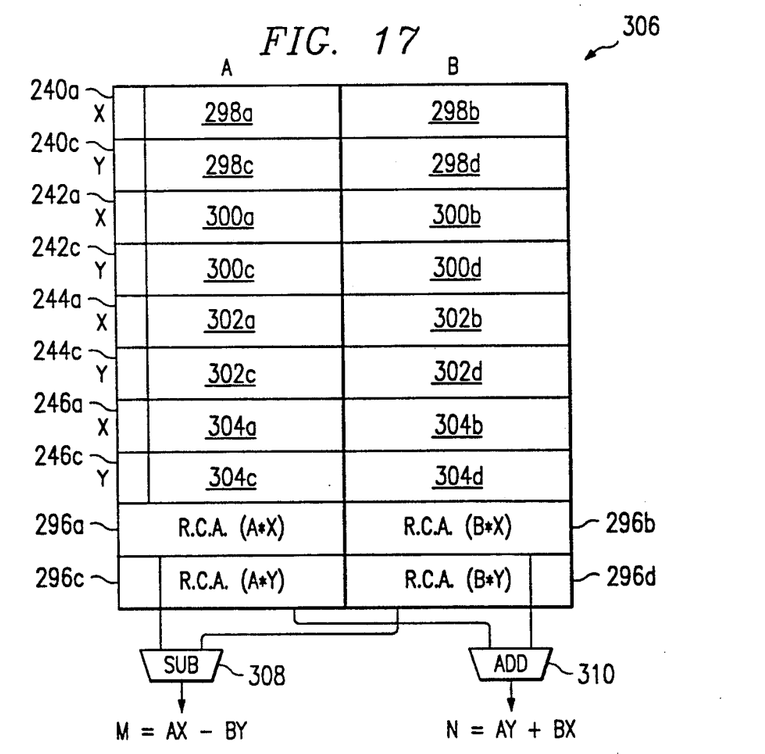
FIG. 17 is a block diagram of the preferred layout of the Booth recoding multiplier in accordance with the teachings of the present invention.

In the preferred embodiment of the present invention, an interleaved complex multiplier implementing the Booth recoding algorithm greatly reduces the total layout area of the multipliers 104 and 108 (FIG. 7). Referring to FIG. 17, a block diagram of an interleaved complex multiplier 306 is shown. Interleaved complex multiplier 306, when compared with the complex multiplier layout shown in FIG. 16, (A*X) stages 298a–304a with their respective recoders 240a–246a are interleaved with (A*Y) stages 298c–304c and their respective recoders 240c–246c. Similarly, (B*X) stages 298b–304b with their respective recoders 240b–246b are interleaved with (B*Y) stages 298d–304d, but share recoders 240a–246a and 240c–246c of (A*X) and (A*Y) stages 298a–304a and 298c–304c. Additionally, ripple carry adders 296a and 296c are stacked and aligned with (A*X) and (A*Y) stages 298a–304a and 298c–304c, and ripple carry adders 296b and 296d are stacked and aligned with (B*X) and (B*Y) stages 298b–304b and 298d–304d. When arranged in the manner shown in FIG. 17, not only is the routing length between the input quantities A, B, X, Y and the multiplier stages reduced, but the area occupied by the multiplier is also reduced since the layout is much more compact and only half as much recoding logic is required. In addition, the output from each multiplier becomes available near the input of subtractor 308 and adder 310, so that routing therebetween is minimal.

It follows that three such interleaved complex multipliers 306 are used to implement the twelve multiplications of the three twiddle coefficient multipliers 104 and 108 and adders/subtractors 112 (FIG. 7). More specifically, the first stage of multipliers 104 includes interleaved partial product generating stages 240a–d, 242a–d, 244a–d and 246a–d of three interleaved complex multipliers, and the second stages of multipliers 108 include ripple carry adders 296a–d of the three interleaved complex multipliers. Six adders/subtractors 112 include one adder and one subtractor for each complex multiplier 310 and 308 to sum the real and imaginary parts of each output.

Note that variations of the Booth recoding multipliers exist and one skilled in the art will appreciate that the invention is not necessarily limited to the Booth recoding multiplier shown in FIG. 15.

Although the present invention has been described in detail, it should be understood that various changes, substitutions and alterations can be made thereto without departing from the spirit and scope of the invention as defined by the appended claims.

What is claimed is:

1. A radix-R FFT (Fast Fourier Transform) architecture comprising:

a memory for storing complex number data, said memory comprising no more than a selected number N memory locations during operation, wherein N is the size of the FFT an there is a positive integer R and N is a power of R;

a pipelined data path comprising circuitry to perform computation operations and including an output stage, said pipelined data path coupled to said memory for accessing R complex number data therefrom, for computing an FFT butterfly, and storing R results from said output stage of said pipelined data path to said memory during one pipeline cycle.

2. The architecture, as set forth in claim 1, further comprising address circuitry coupled to said memory for generating memory read and write addresses.

3. The architecture, as set forth in claim 1, wherein said pipelined data path comprises:

a plurality of adders for summing said complex number data from said memory and producing a plurality of summed data, each said adders having an output;

a first plurality of pipeline buffers, each said pipeline buffer having an input and an output each said pipeline buffer inputs coupled to a corresponding adder output; and a plurality of multipliers coupled to said plurality of adders for receiving said plurality of summed data multiplying said summed data and a set of predetermined twiddle coefficients, and producing a plurality of complex number products, each said multiplier having an input coupled to a corresponding pipeline buffer output.

4. The architecture, as set forth in claim 3, further comprising:

a coefficient memory coupled to said plurality of multipliers for storing said set of twiddle coefficients; and coefficient address circuitry coupled to said coefficient memory for generating coefficient memory read addresses.

5. The architecture, as set forth in claim 3, further comprising:

detection circuitry coupled to said plurality of multipliers for receiving said plurality of complex products and producing a scaling factor; and scaling circuitry coupled to said detection circuitry and said memory for scaling said data accessed herefrom in response to said scaling factor.

6. The architecture, as set forth in claim 1, further comprising permutation circuitry coupled to said memory, said memory storing said complex number data in a predetermined sequence, said permutation circuitry for altering said predetermined sequence of said complex number data prior to entering said pipelined data path.

7. The architecture, as set forth in claim 1, wherein said memory includes R banks of random access memory, each bank of memory for storing N/R complex number data, with one complex number data being accessed from each of said R banks concurrently.

8. The architecture, as set forth in claim 1, wherein said memory includes four banks of random access memory, each bank for storing N/4 complex number data, with one complex number data being accessed from each of said four banks concurrently during the first half of said pipelined cycle, wherein N is a power of 4.

9. The architecture, as set forth in claim 8, wherein said pipelined data path comprises:

sixteen adders for summing four complex number data from said memory and producing four complex number sums during said pipeline cycle;

three complex multipliers coupled to said adders for receiving three of said four complex number sums, multiplying said three sums and three twiddle coefficients, and producing three complex number products during said pipeline cycle; and a plurality of pipeline buffers coupled between said sixteen adders and said three complex multipliers.

10. An N-point radix-R, where R is a positive integer and N is a power of R, decimation-in-frequency Fast Fourier Transform (FFT) architecture comprising:

a memory for storing data, said memory comprising no more than a selected number N memory locations during operations, wherein N is the size of the FFT;

a plurality of adders coupled to said memory for summing R data and producing a plurality of sums;

a plurality of pipelined complex multipliers coupled to said plurality of adders for receiving said plurality of sums, multiplying said plurality of sums with a set of predetermined twiddle coefficients, and producing a plurality of products; and a plurality of pipelines buffers coupled between said plurality of adders and said plurality of complex multipliers and a final stage buffer, said final stage buffer for storing a plurality of results into si memory during one pipeline cycle.

11. The architecture, as set forth in claim 10, further comprising address circuitry coupled to said memory for generating memory read and write addresses.

12. The architecture, as set forth in claim 10, further comprising:

a coefficient memory coupled to said plurality of multipliers for storing said set of twiddle coefficients; and coefficient address circuitry coupled to said coefficient memory for generating coefficient memory read addresses.

13. The architecture, as set forth in claim 10, further comprising:

detection circuitry coupled to said plurality of complex multipliers for receiving said plurality of products and producing a scaling factor; and scaling circuitry coupled to said detection circuitry and said memory for scaling said data accessed therefrom in response to said scaling factor.

14. The architecture, as set forth in claim 10, further comprising permutation circuitry coupled to said memory, said memory storing said data in a predetermined sequence, said permutation circuitry for altering said predetermined sequence of said data prior to entering said plurality of multipliers.

15. The architecture, as set forth in claim 10, wherein said memory includes R banks of random access memory, each bank of memory for storing N/R complex number data, with one complex number data being accessed from each of said R banks concurrently.

16. The architecture, as set forth in claim 10, wherein said memory includes four banks of random access memory, each bank for storing N/4 complex number data, with one complex number data being accessed from each of said four banks concurrently during the first half of said pipeline cycle.

17. The architecture, as set forth in claim 16, wherein sixteen adders sum four complex number data from said memory and produce four complex number sums during said pipeline cycle; and three complex multipliers multiply said sums and three twiddle coefficients, and produce three complex number products during said pipeline cycle.

18. The architecture, as set forth in claim 10, further comprising permutation circuitry coupled to said plurality of multipliers for receiving said plurality of products and altering the sequence of said products, said permutation circuitry coupled to said memory and storing said products in the altered sequence therein.

19. An N-point, radix-R, where R is a positive integer an N is a power of R, decimation-in-frequency Fast Fourier Transform (FFT) computing circuit comprising:

R banks of memory for storing no more than N data during operation, each of said R banks storing N/R data and arranged for accessing R data therefrom concurrently;

a first permutation network coupled to said R banks of memory for receiving said R data;

scaling circuit coupled to said permutation network for scaling said R data in response to a predetermined scaling factor;

a plurality of adders coupled to said scaling circuit for summing said R data and producing R sums;

a coefficient memory for storing a set of twiddle coefficients;

a plurality of multiplier coupled to said adders and said coefficient memory for performing multiplications of said R sums and said set of twiddle coefficients and producing R products;

detection circuitry coupled to said plurality of multipliers for receiving said R products and producing said scaling factor; and a second permutation network coupled to said detection circuitry for inputting said R products and reordering the sequence of said R products, said second permutation network coupled to said R banks of memory and storing said R products therein.

20. An N-point, where N is a power of 4, radix-4, decimation-in-frequency FFT (Fast Fourier Transform) computing circuit comprising:

four banks of memory for storing no more than N data during operation, each of said four banks storing N/4 data and arranged for accessing four data therefrom concurrently;

a first permutation network coupled to said four banks of memory for receiving said four data;

scaling circuitry coupled to said permutation network for scaling said four data in response to a predetermined scaling factor;

a plurality of adders coupled to said scaling circuit for summing said four data and producing four sums;

a coefficient memory for storing a set of twiddle coefficients;

a plurality of multipliers coupled to said adders and to said coefficient memory for performing multiplications of said four sums and said set of twiddle coefficients an producing four products;

detection circuitry coupled to said plurality of multipliers of receiving said four products and producing said scaling factor; and a second permutation network coupled to said detection circuit for receiving said four products and reordering the sequence of said four products, said second permutation network coupled to said four banks of memory and storing said four products therein.

* * * * *